Figure 1:
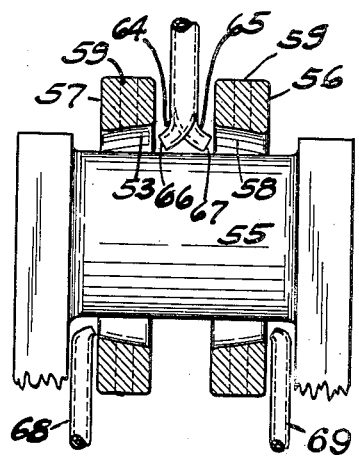

Patented Sept. 3, 1940

2,213,241

UNITED STATES PATENT OFFICE 2,213,241

METHOD OF PRODUCING A HEAT TREATED ARTICLE

Francis S. Denneen, Cleveland, William C. Dunn, Shaker Heights, and Courtney N. Mitchell, Berea, Ohio, assignors to The Ohio Crankshaft Company, Cleveland, Ohio, a corporation of Ohio Application March 29, 1934, Serial No. 718,003
Renewed December 4, 1939

9 Claims. (Cl. 148—21)

The present invention, as a further improvement on that shown and described in co-pending application Serial No. 689,904, relates to the article produced by and the procedure employed in the use of the apparatus shown and described in another application being filed herewith. Whereas, application Serial No. 689,904 refers generally to means and method for electrically heating metal articles to be quenched to provide hardened surfaces thereon, the present application is more specific in its scope, being confined to more definite and detailed uses of the general process taught in the above numbered application.

In the heat treatment of metals generally and in the hardening of ferrous metals in particular, there have been no teachings which would enable those skilled in the art to proceed in such a manner as to produce electrically hardened zones of metal of predetermined characteristics as to depth and general contour. In surface hardening processes used heretofore many variations occurred in the structure of the metal of the core and in the metal immediately under the hardened shell which cause failures when this surface was submitted to localized impacts or to stresses tending to produce a shearing effect between the shell and the core. In many cases extremely hard surfaces are required in articles which are subjected to such heavy loads that stresses closely approaching the elastic limit of the metal are set up in the surface fibres. Under such conditions a hard shell, having poor characteristics as to ductility, or improper bond between the core and hard outer shell tends to crack at points of change in the continuity of the surface, such as at grooves, oil holes, corners made with too small fillets and other like locations.

With these conditions in view, this invention has, as its chief object, the provision of an article having a hard surface without changes detrimental to the characteristics possessed by the core prior to hardening and provided therein by previous heat treatment or working. Another object of this invention is to provide an article having a hardened portion in two or more intersecting surfaces. A further object is to provide an article in which the hard outer portion will not cleave or separate from the inner or core portion under severe strains. An additional object is to provide a bearing in which the depth of the hardened zone varies as may be required. Another object is to provide a recessed article in which the surface structure around the recess does not differ appreciably from that at other parts of the surface. A further object is to provide a method for producing such a surface hardened article which is rapid, inexpensive and reliable and with the desired uniformity in the product thus produced.

Figure 3:
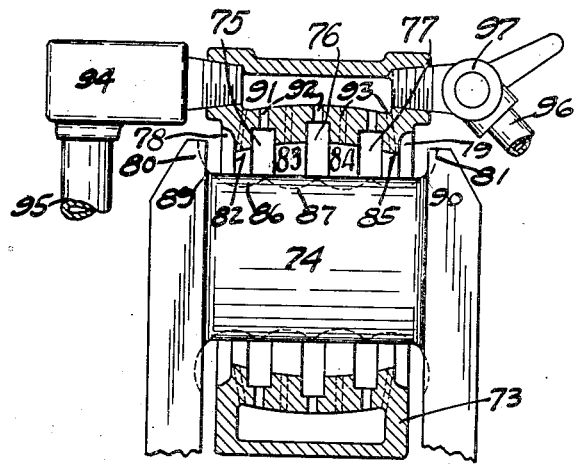
Figure 2:
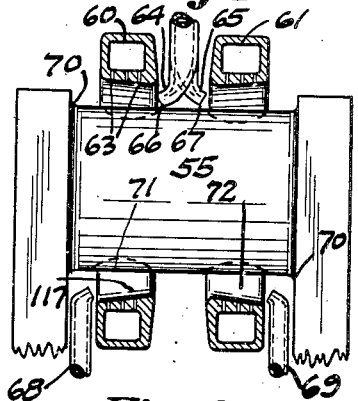
Figure 4:
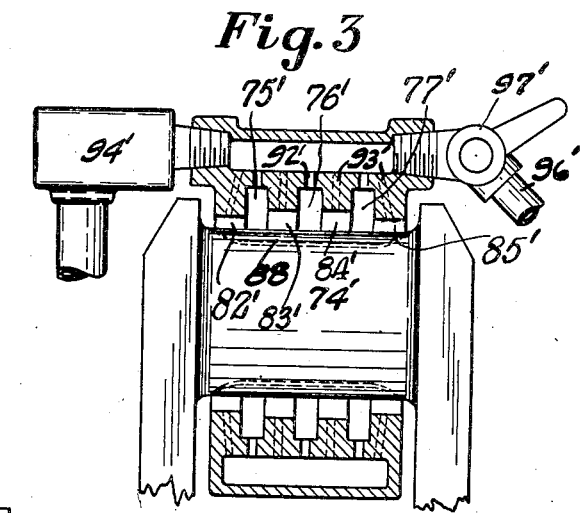
Figure 5:
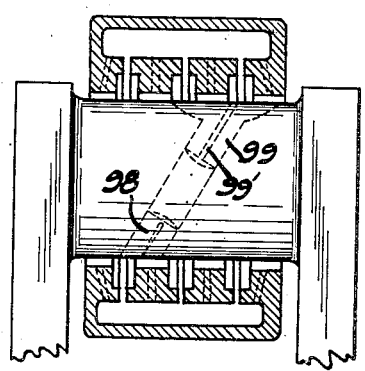

In the drawing:

Fig. 1 is a longitudinal view, partly in section, of a bearing with divided ring type electrodes surrounding it. Fig. 2 is a modification of the construction shown in Fig. 1. Fig. 3 is also a longitudinal view, partly in section, of another type of divided ring electrode in place over a shaft to be hardened. Fig. 4 is a modification of the apparatus shown in Fig. 3. Fig. 5 illustrates a method to be used in hardening recessed bearings.

Fig. 1 represents one form of apparatus employed in the practice of our invention. In this illustration the shaft or bearing 55 is surrounded by ring type electrodes 56 and 57. These electrodes are made so as to be opened to receive the bearing and are formed to substantially surround it, thus heating the entire circumferential surface under the electrode without rotating or oscillating this surface. These electrodes may be formed as indicated at 58 to offer a greater air gap in the region of the center of the bearing than at its ends. These electrodes are made substantially solid with intermittent passages such as 59 for the escape of quenching liquids, gases or vapors from the vicinity of the shaft surface. On the other hand, they may be made as shown at 60 and 61 in Fig. 2 having cooling jackets spaces 62 within to cool the electrodes themselves and in connection with passages 63 to serve as distributing means for the quenching fluid. Each one of these electrodes being considerably narrower than one half of the bearing, they are adapted to being moved axially thru a substantial range to regulate the distribution of heat. This movement may be continual during the heating period or each electrode may be moved into any desired position and fixed in that position before the heating period begins.

In addition to, or as a substitute for, the distribution of quenching fluid provided by passages 59 and 63, tubes such as 64 and 65 are provided between the electrodes 56 and 57, and have oppositely directed nozzles or outlets 66 and 67 disposed to deliver quenching fluid into the space between the electrodes and shaft 55, the greater air gap at the inner faces of the electrodes enhancing the flow of this fluid. If the tubes are not placed adjacent to each other in an axial direction relative to the shaft, but are spaced circumferentially with their nozzles directed alternately as shown toward opposite ends of the shaft or bearing 55, the electrodes 56 and 57 can be made wider or caused to move axially along the bearing over greater distances. The circumferential spaces between the tubes thus arranged serve as passages for the escape of steam or other vapor formed in quenching or for the outward flow of part of the coolant used. On the other hand, the tubes may be located as shown at 68 and 69 in both Figs. 1 and 2 at opposite ends of the shaft or bearing and with their nozzles directed oppositely and into the air gap between the electrodes and shaft. With the structure thus formed the electrodes are sufficiently spaced from the fillets 70 at the end of the shaft to insure keeping these fillets cool and thus unhardened while the form and/or movement of the electrodes provides for any desired distribution of heat in other parts of the shaft surface. Also, with this arrangement of the electrodes a very efficient flow of the cooling fluid is possible, it flowing in freely from both ends of the bearing along the heated surface and escaping in the annular space between the electrodes. To avoid heating of the tubes under some circumstances, it may be desirable to make the tubes of some non-conducting material.

It will be evident that the hardened zones may have the form as indicated by the broken lines at 71 and 72 in Fig. 2 or these two zones may be blended together by the form or movement of the electrodes to form a substantially continuous single zone across the entire bearing with any desired tapering out in depth near the fillets 70. Further, currents of different densities and/or frequencies may be employed in the different electrodes to produce different heating rates and depths of heated zones. In addition, the number and location of the electrodes may be varied over a comparatively wide range to produce an almost unlimited variety of surface conditions in the shaft or bearing.

In Fig. 3 the apparatus employed is shown in a somewhat different form to provide means for a modification in the method of procedure. In this form the electrode 73 is made as a substantially single ring adapted to be opened to receive the shaft or bearing 74. The face of this electrode adjacent to the shaft may be of a general curved form as shown to provide a greater air gap at its central parts than at its sides. This face is provided with circumferentially extending grooves such as 75, 76, and 77 which control the distribution of current across this face and the resulting distribution of heat along the surface of the shaft. By suitably forming the side portions 78 and 79 of this electrode, the faces 80 and 81 of the flanges at the ends of the bearing are heated to hardening temperature as well as the cylindrical portions directly under the electrode. The inwardly projecting rings 82, 83, 84 and 85 produce heated zones substantially as shown by the scalloped broken lines at 86 and 87. By giving the electrode a reciprocating movement axially of the bearing during the heating period, variations in the depths of the zones may be eliminated or reduced providing a substantially uniform depth of hardened zone as indicated at 88. By reducing the total width of the electrode and modifying the form of its side faces 78 and 79, the depth of the hardened zone may be reduced gradually as it approaches the fillets at 89 and 90.

For the purpose of quenching the heated surfaces of shaft 74, suitable quenching mediums such as brines, caustic solutions, oil, water or gases are employed. These are conducted thru the jacket space 91 of the electrode to reduce its temperature and from there they are projected onto the heated surface of the shaft thru passages 92 which ordinarily discharge thru the grooves 75, 76 and 77, but other passages such as 93 are also employed traversing the rings 82, 83, 84 and 85, thus providing a more complete distribution of the coolant and a more uniform quenching effect. As foreign particles or undissolved salts or hydroxides may obstruct the flow of the quenching fluid thru passages 92 and 93, the strainer 94 is provided to remove such particles as may be suspended in the cooling liquid. A valve for controlling the delivery of coolant to the jacket space 91 is located in the pipe 95. Air under pressure from the pipe 96 may be admitted to the jacket by means of valve 97 to clear the jacket of residual coolant after the cooling interval to prevent further flow or dripping during the subsequent heating interval.

In Fig. 4 the alternate rings and grooves have a somewhat different form, the central rings 83' and 84' having their faces substantially parallel with the shaft 74' but spaced farther therefrom than the end rings 82' and 85'. Passages such as 92' for the coolant enter the grooves 75' 76' and 77' from which the coolant is distributed onto the surface of the shaft. Other coolant passages 93' pass through the rings.

In many cases the surface to be hardened is perforated by various types of openings, such as oil holes in bearings as is indicated in Fig. 5 or keyways or other recesses. As the normal distribution of induced current and coolant is such as to cause extreme local hardness and a tendency of the metal to crack at the edges of these openings, provision is made to prevent or retard the penetration at these edges of both the heat and the quenching action. This may be accomplished by partially or completely filling the recess either with a solid plug, preferably of low carbon non-hardening steel as indicated at 98 or with a plastic or semi-plastic material as at 99. Regardless of the material used, it is desirable that it possess magnetic properties and current carrying ability as closely approximating that of the metal in the shaft as possible. Further, it is desirable that the nature of the material be such that after heating and quenching it will remain softer than the hardened surface so as to permit easy removal. Finely divided low carbon steel mixed with asbestos, clay or some other material and a suitable binder may be used to advantage. This mixture may be molded to shape, baked or dried, and then inserted in the recess or it may be pressed in the recess in plastic condition. Since the gas in the plugged recess expands with heat and tends to force the plug out of place, it is desirable that a sufficient vent such as 99' be provided either in the plug itself or by a loose fit at some point, or the plug itself may be made sufficiently porous to permit the gas to escape.

It will be evident that the method herein disclosed can be used in obtaining a wide variety of physical conditions in articles of varied forms. Modifications and additions in the steps of the process may be made for special adaptations. Among these are the localized hardening of steels too low in carbon content to be hardened without carburizing and the tempering of a hardened article to relieve strains in the metal caused by the hardening or other previous treatments.

In event the carbon content of the steel is extremely low, of the order of .20% or less, it is usually not possible to secure the desired local hardness by heating to the temperature of decalescence and quenching as heretofore described. To correct for this condition, the surface to be hardened is carburized in advance, usually by the packing process or gas carburizing. Formerly when hardness of a local nature only was required it was necessary to shield, during the carburizing, the parts to remain soft, either by preventing the carburizing material from coming into the vicinity of the part or parts to remain soft or by shielding the part or these parts by the usual plating process which comprised electro-plating the article and then machining off, before carburizing, the plating on the surfaces to be hardened, or by carburizing the entire article and machining off, before heating and quenching, the carburized portions where soft surfaces were required. In the present process the hardening by carburizing is much simplified in that no precautions are required to prevent local carburizing, it being permissible to carburize all surfaces and then to heat and quench locally only the surfaces required to be hard. All other surfaces, altho, carburized, have not been heated and quenched and therefore are soft and not subject to local or incipient fractures.

After a zone on an article has been hardened it is then desirable to relieve the internal strains by tempering; that is, by re-heating. In re-heating, the temperature must be kept low enough that the hardness previously imparted may not be appreciably impaired.

By our method, this tempering may be properly accomplished quickly, easily, and inexpensively. Having hardened the zone desired by heating and quenching as heretofore described, the tempering is accomplished with the article still in place in the hardening equipment by simply applying less heat than was used in the first heating before quenching, and controlling the time of such heating. This may be accomplished by supplying to the heating electrode current of the same frequency used in the first heating but of less intensity or, if desired, current of some other, preferably lower, frequency may be applied. Another method of tempering the hardened zone while the article is still in place in the equipment and which under some conditions may be used to supplement the heat from induced currents is to spray the article with oil heated sufficiently to accomplish tempering, the oil being delivered through the same apparatus as used for quenching. After the article has been heated and quenched and the apparatus which delivers the cooling fluid cleared of that fluid by means of air supplied through the valve 97, of Fig. 3, that valve is closed and through a three way valve, not shown, in the line 95, and arranged to supply either coolant or hot oil as required, a supply of hot oil is delivered to the apparatus. Obviously, in place of oil other heating means could be used.

In securing the desired outlines and depths of the hardened areas, the form of the electrodes have an importatnt effect as heretofore indicated. To obtain the hard zone for the thrust face shown at 80 in Fig. 3 the inner circumferential corner of the electrode may be cut away to present various contours one of which is shown at 116 to regulate the distribution of heat and therefore hardness in this thrust face. On the other hand, the electrode may be formed as shown in a general way in Fig. 2, the inner circumferential surface being tapered as shown at 117 thus providing a greater air gap between the electrode and the fillet 70 when the nozzle 69 is removed and the electrode is caused to move axially along the bearing during the heating interval. Also the nozzle 69 may be formed in various ways to reduce the intensity of the cooling at the fillet.

As indicated above, the hardened zones may be made to assume various forms, those indicated at 86, 87 and 88 in Fig. 3 being typical of such zones. The tapering out at the ends of bearings as at the fillets 89 and 90 is usually desirable to avoid incipient fractures. The surface heating by the induction of high frequency currents being vigorous and confined to a thin layer of metal, the inner portion or core is little affected by the heating and quenching of the surface metal. However, between the outer shell indicated at 88, which has been quenched rapidly from a high heat, and the inner core, there is a transition zone, either of minute or appreciable thickness indicated at 118 which serves as a bond between the very hard outer zone and the softer core. These various zones do not differ appreciably in their chemical compositions as to the elements present, but do differ in the combinations of these elements. In carbon steels and alloy steels containing hardening carbon, the outer zone 88 will consist mainly of martensite. The composition of the intermediate or bonding zone is of vital importance, for this zone must be strong in itself and must possess a strong, intimate bond with both core and hardened zone. Otherwise, due to the torsional and other strains to which the bearing is subjected, fracture in the bonding area will occur, resulting in cracking or breakage in the hardened zone, or cleavage between that zone and the core.

With any method of zone hardening of a steel article, the intermediate or bonding zone will consist of transition combinations such as sorbite and troostite, as well as certain other combinations or ingredients formed from the elements present in the steel. The presence of an appreciable amount of free ferrite in the bonding zone so reduces the strength of that zone that fractures readily occur. When a zone on a steel article has been raised to hardening temperature by any ordinary method, heating is accomplished so slowly that heat penetrates to quite an appreciable depth, making it impossible to quench and cool the zone quickly enough to prevent the formation of free ferrite in the bonding zone. Formation of free ferrite in the bonding zone can be prevented only by so processing the work that quenching and cooling of the heated zone is accomplished practically instantaneously. With all other known methods of zone hardening this instantaneous quenching and cooling is impossible to accomplish. With the method herein disclosed, however, by the use of high frequency induced currents in the zone to be hardened, the heating is accomplished so quickly and the heated zone kept so shallow and heated so uniformly, it is possible to quench and cool the heated zone before free ferrite has had an opportunity to form in the bonding zone. It is evident, therefore, that by our method of hardening an intermediate zone is obtained which possesses physical characteristics superior to those usually present in case hardened steels, in that its content of free ferrite is at a minimum and other weakening combinations which may be present appear in sufficiently small quantities to insure this zone having physical properties equal to or closely approximating those of the core.

The accompanying drawing illustrates, and the preceding description explains, the application of our process to cylindrical articles having circular cross sections. It will be readily understood that the cross sections of these cylinders, as in mathematical considerations, may have numerous other forms such as ellipses, parabolas, and egg shaped figures, used for cams and the like. Also it will be understood that in such cylinders the degree of hardness and the depth of the hardened zone or zones may be made to vary in numerous ways axially and circumferentially by numerous suggested modifications of the process herein disclosed. Our process is equally adapted to heat treating or zone hardening all or portions of solids of any form. The modifications in the details of the methods as herein disclosed, that would be necessary in processing forms other than as have heretofore been indicated or described, should at once suggest themselves to anyone skilled in the art. Accordingly, the terms employed are to be considered in their broad and general sense and are not to be limited to any one of the particular forms shown or mentioned heretofore.

It will be noted that in general the terms "heat treating" and "hardening" have been used synonymously, as hardening is one kind of heat treating and heat treating, in a general sense, aside from annealing processes, is hardening, the degree and depth of hardening being determined by the rate and time of heating and the method and coolant used in quenching. The greater degrees of hardness in general are obtained by the use of caustic solutions or brines instead of water, and the use of oils is resorted to when less hardness is desired than can be obtained by using water as a coolant.

We have found that for many general purposes a chromium-molybdenum alloy steel containing approximately 1% chromium and .20% molybdenum has many advantages over other steels. Among these advantages are better ability to resist shocks and fatigue which is measured by its Izod value.

In the case of a shaft bearing, for instance, if made of other steel alloys, a surface defect such as a tool mark or scratch at a fillet would probably result in a fracture. The superior fatigue resisting ability of this alloy, however, would cause the bearing to stand up indefinitely without fracture. This alloy is more ductile, and if desired, a higher core strength may be obtained by proper heat treatment prior to zone hardening than is obtainable with other alloys.

This chromium molybdenum alloy permits quicker cooling during any quenching operation, and, therefore, has greater wear resisting qualities, either before or after zone hardening, than other alloys similarly treated. Since the desired hardness can be more readily attained, and further, for the reasons previously set forth herein, the free ferrite content in the bonding zone between the hardened zone and the core may be held to the minimum, and the bond made stronger and more perfect.

Other modes of applying the principle of our invention may be employed instead of the ones explained, change being made as regards the means herein disclosed, provided those stated by any of the following claims or their equivalents be employed.

We, therefore, particularly point out and distinctly claim as our invention:

1. In heat treating an axially extending metallic article, the process of surrounding a part of said article with a conductor, supplying high frequency current to said conductor, relatively reciprocating said article and said conductor in a longitudinal direction during a heating interval, and then quenching the surface of said article by projecting a cooling medium substantially along an element of said surface and into a space between the article and the conductor.

2. In a process for modifying a surface zone of an article adapted to be hardened by heating and quenching, the steps comprising placing the article in spaced relationship with a conductor, supplying high frequency current to the conductor, moving the article and the conductor relatively to each other with sufficient rapidity to distribute heat substantially uniformly in a surface zone of said article, and then projecting streams of fluid in different directions into a space between the article and the conductor, one of the streams being directed substantially along a longitudinal element of the surface of the article, the last said stream intersecting with another stream at the said surface.

3. In heat treating an axially extending metallic article adapted to be hardened by heating and quenching, the process of embracing a part of said article with a conductor, supplying high frequency current to said conductor, giving said article and said conductor relative reciprocating movement in a longitudinal direction during a heating interval, and then quenching the surface of said article by projecting a cooling medium substantially simultaneously from two directions into a space between the article and the heating member while reciprocating movement continues.

4. In modifying a surface zone of a cylindrical article adapted to be hardened, the process of bringing the faces of relatively spaced conductors into spaced relationship with said article, supplying current to said conductors whereby a surface zone of said article is heated as a circumferentially extending band, and then projecting quenching fluid substantially simultaneously onto the surface zone between said conductors and through one of the conductors.

5. In modifying a surface zone of a metallic article, the process of placing a heating member in spaced relationship with the surface zone, supplying heating energy to said heating member whereby said surface zone is heated, projecting a quenching medium into the space between said surface zone and said heating member whereby said surface zone is suddenly cooled, ejecting said quenching medium and then flowing into the aforesaid space a re-heating medium.

6. In a method of heat treating a metal article, the steps which consist in inducing in a surface zone of said article an alternating current by means of relatively spaced proximate inductors, giving to the inductors a reciprocating movement to control heating, and then cooling the article by flowing a quenching fluid axially along a heated part so rapidly that incipient vapor pockets are removed and the surface is cooled so rapidly that if subjected to microscopic examination said surface zone will show no free ferrite at less than 500 diameters of magnification.

7. In a process for heat treating a cylindrical article the steps comprising placing peripherally extending inductors in spaced relationship along the cylindrical article, the distance between the article and the inductors varying progressively along an axis of the article whereby proximity effect is controlled, supplying high frequency current to said inductor whereby heating current is induced in a surface zone of the article, and then quenching said article by causing fluid to flow simultaneously through the inductors and through passages between the inductors.

8. In a process for heat treating a metal article the steps comprising placing conductors in adjacent relationship, each of the conductors surrounding a part of the article, supplying current to said conductors whereby heating current is induced in said article, and then quenching the article by flowing a quenching fluid along a surface of the article and permitting said fluid to escape through a space between the adjacent conductors.

9. In modifying a surface zone of a metal article, having a filleted area, the process of placing a conductor in spaced relationship with a surface zone of the article, supplying inducing current to said conductor whereby heating current is induced in said surface zone and in said filleted area, and then quenching said article by projecting a quenching fluid onto said surface zone, the quench being directed away from the filleted area so that the quenching of the filleted area is less rapid than is the quenching of an adjacent part of the said surface zone.

FRANCIS S. DENNEEN.
WILLIAM C. DUNN.
COURTNEY N. MITCHELL.